Patented Sept. 14, 1954

2,689,181

UNITED STATES PATENT OFFICE 2,689,181

PROCESS FOR PREPARING CACAO BEANS

William R. Johnston, Bronxville, and Herbert Elliott Foote, Chappaqua, N. Y., assignors to Standard Brands Incorporated, New York, N. Y., a corporation of Delaware No Drawing. Application January 29, 1951, Serial No. 208,430

5 Claims. (Cl. 99—23)

This invention relates to an improved process for preparing cacao beans from cacao fruit. More specifically, it relates to an improved process for the removal of the pulp from cacao beans.

The usual process for freeing the beans from the adhering pulp involves a spontaneous fermentation or rotting of the pulp for about four days while the beans are stored in heaps or in vats. At the end of this period the decomposed pulp is washed away by water and the beans dried to produce the cacao beans of commerce.

Because of the uncontrolled nature of the usual fermentation process, particularly with respect to the lack of control over the growth and development of microorganisms during the process, the quality of the finished cacao beans is variable. Furthermore, fermentation by-products may be absorbed by the beans and may deleteriously affect the flavor of the roasted bean.

We have discovered that removal of the pulp may be accomplished in one day or less by the use of pectic enzymes. Besides offering obvious time- and labor-saving advantages the use of pectic enzymes greatly reduces the possibility of the formation of off-flavors due to absorption of fermentation by-products.

In accordance with the invention a pectic enzyme preparation is added to the pulp-covered cacao beans after their removal from the pod. The cacao beans are then heaped or placed in a vat for a period up to 24 hours depending in part upon the ambient temperature and the amount of enzyme applied. Agitation of the mass of cacao beans will accelerate the pulp-dissolving action of the enzyme preparation but is not essential to the success of the process. The invention is also applicable to the treatment of cacao beans from which some of the adhering pulp has been removed by mechanical or other means.

Pectic enzyme preparations derived from any source are suitable for carrying out the process. They contain more than one enzyme but it is probable that those most effective in the process of the invention are pectin esterase and pectinase (polygalacturonase) and particularly the former. We prefer to use the pectic enzyme preparations obtained from mold fungi.

The following example illustrates a method of application of the invention:

*Example*

2.16 grams of a pectic enzyme preparation were added to 2.16 kilograms of pulp covered cacao beans as taken from the pod. The enzyme was thoroughly distributed throughout the beans by agitation and the mass was placed in a room maintained at a temperature of 86° F. After 24 hours the pulp had been decomposed to a point where it could be easily washed from the beans by water. The washed beans were then dried in a tray drier with circulating warm air. The cacao beans thus produced were possessed of light colored skins, an intensely black color of meat and a desirable brittleness. They were judged to be wholly acceptable for further processing (roasting).

By the use of a higher concentration of enzymes the pulp may be digested and loosened in a shorter time. While we prefer to use fresh beans obtained from freshly harvested cacao fruit which have not undergone any fermentation, we can also use the process to hasten the removal of the pulp from beans which have undergone some fermentation.

We use the term "fermentation" herein to mean microbial fermentation.

We claim:

1. A process for removing pulp from cacao beans which comprises adding a preparation of pectic enzymes to cacao beans having adhering pulp, allowing the enzymes to act on the beans for a period not exceeding 24 hours until the pulp is loosened and then separating the loosened pulp.

2. Process as claimed in claim 1 which is completed without substantial fermentation.

3. A process as claimed in claim 1 wherein the beans are freshly harvested.

4. Process as claimed in claim 1 which includes agitating the beans periodically during the treatment with the enzymes.

5. Process as claimed in claim 1 wherein the preparation of pectic enzymes is obtained from a mold.

References Cited in the file of this patent

UNITED STATES PATENTS

| Number | Name | Date |
|---|---|---|
| 2,526,873 | Johnston et al. | Oct. 24, 1950 |